United States Patent [19]

Oelschlaegel

[11] Patent Number: 4,922,960
[45] Date of Patent: May 8, 1990

[54] SELF VENTING DRAIN VALVE

[75] Inventor: Victor R. Oelschlaegel, Modesto, Calif.

[73] Assignee: Parker-Hannifin Corporation, Cleveland, Ohio

[21] Appl. No.: 379,460

[22] Filed: Jul. 13, 1989

[51] Int. Cl.[5] .............................. F16K 24/00
[52] U.S. Cl. ..................... 137/588; 251/180
[58] Field of Search ............ 137/588; 251/180; 222/481.5, 484; 210/248

[56] References Cited

U.S. PATENT DOCUMENTS

| | | | |
|---|---|---|---|
| 928,813 | 7/1909 | Spikes | 137/588 |
| 1,306,210 | 6/1919 | Zucker | 251/180 X |
| 1,490,150 | 4/1924 | Wagner | 251/180 |
| 2,054,488 | 9/1936 | Sinks | 137/588 X |
| 2,056,042 | 9/1936 | Fausek et al. | 251/180 |
| 2,878,829 | 3/1959 | Folmsbee | 137/588 |
| 4,440,193 | 4/1984 | Matheson | 137/588 X |
| 4,611,627 | 9/1986 | Eidsvoog et al. | 137/588 |
| 4,708,171 | 11/1987 | Cudaback | 137/588 |
| 4,724,074 | 2/1988 | Schaupp | 210/163 |
| 4,753,266 | 6/1988 | Matheson et al. | 137/588 X |
| 4,855,041 | 8/1989 | Church et al. | 137/587 X |

FOREIGN PATENT DOCUMENTS 143263  10/1935  U.S.S.R. ................... 251/180

Primary Examiner—John Rivell
Attorney, Agent, or Firm—Ralph E. Jocke

[57] ABSTRACT

A self venting drain valve (10) for a fuel filter/water separator unit or other air tight fluid container is disclosed. The valve includes a arcuately elongated fluid hole (18) and a vent hole (20) in a lower wall (12) of the unit. A cylindrical movable member (36) is mounted for rotational movement on a pivot post (16) which extends downward from the unit. The movable member includes an upper planar face (40). A arcuately elongated slot (42) in the movable member is in fluid connection with a liquid outlet (46). The movable member also includes an air passage (48) in communication with an air intake (52). In a first rotational position the movable member blocks liquid flow out of the unit as well as air flow into the unit. In a second rotational position, the fluid hole on the unit is in communication with the liquid outlet opening of the movable member while the air flow into the unit remains blocked. In a third rotational position, the fluid hole in the wall is fully aligned with the elongated slot on the movable member while the air passage on the movable member is aligned with the vent hole in the unit. This enables air to enter the unit and the liquid to readily escape through the liquid outlet of the movable member.

22 Claims, 4 Drawing Sheets

4,922,960

SELF VENTING DRAIN VALVE

TECHNICAL FIELD

This invention relates to drain valves used to drain liquids from containers. Particularly this invention relates to a self venting drain valve which enables draining liquid from a generally air tight container such as the body of a fuel filter/water separator.

BACKGROUND OF INVENTION

Containers for liquids are periodically drained for a variety of reasons. If the container is air tight, provisions should be made for allowing air to enter the container. The air displaces the liquid and enables the liquid to more readily drain. Fuel filter/water separators used in vehicle fuel systems must periodically be drained to purge contaminants which accumulate therein. In many types of fuel filter/water separators, air must be introduced into the body of the unit before the contaminants may be drained.

To enable draining air tight containers, several types of self venting drain valves have been previously developed. These self venting drain valves are generally mounted at or near the bottom of the container. These valves introduce air into the container through an inlet while allowing the fuel and/or contaminants to drain through a fluid outlet in the valve. In some designs, such as the one shown in U.S. Pat. No. 4,724,074, the air inlet is located in close proximity to the fluid outlet of the valve. In such designs it is usually necessary to prime the fluid outlet of the valve in advance of the air inlet vent being opened. Priming the fluid outlet creates a slight vacuum inside the unit. Thereafter, when the air vent is opened, only air will be drawn in through the vent. This avoids liquid flowing outward through the vent as well as air being drawn into the unit through the liquid outlet opening. Either of these conditions would impede draining of the unit.

Self venting drain valves of the type previously known to Applicant have been constructed in two ways. The most common type of self venting drain valve uses a threaded knob which is accepted into the underside of the fluid container. The knob contains two integral passageways. From a closed position, the knob is rotated several turns which causes it to move outward due to the interaction of the threads. Eventually, a liquid passageway is opened through the knob to the interior of the fluid container. The opening of the liquid passageway primes the outlet of the drain valve. Further rotation of the knob additional turns, opens an air passageway which vents the container and enables air to displace the liquid which flows outward through the liquid outlet of the valve. This type of self venting drain though generally satisfactory, presents certain disadvantages. First, it requires the use of mating threads on the knob and on the container. It also requires two separate seals and sealing surfaces. These features add to manufacturing cost and each is a potential source of leakage or failure of the valve.

Another type of self venting drain valve construction employs a threaded drain knob and a spring loaded vent. As the knob is turned several rotations a fluid outlet is opened. Further outward movement of the knob opens a spring loaded vent allowing air to enter the interior of the container. Such construction is shown in U.S. Pat. No. 4,855,041 which is owned by the assignee of the present invention. Again, this type of drain valve construction has the associated expense and potential problems of threaded pieces and multiple seals.

Both types of conventional self venting drain valves have an additional drawback that the drain knob must be turned multiple turns to reach an opened condition. This takes time. Also, the knobs typically have no stops to prevent them from being over tightened when closed, or from being loosened too far to a point where the knob disengages the threads and falls off the container.

Another type of prior art drain valve shown in U.S. Pat. No. 4,753,266 has a body member that extends into the container to be drained and a rotatable valve member disposed outboard thereof. The valve member is turned in a threaded guide to bring fluid outlet and air inlet openings in the body and valve members into alignment to vent and drain the container. The body is configured so that the opening for the vent is at a higher vertical elevation in the container than the opening for the fluid. This ensures that air goes in and fluid comes out the proper openings. This valve design must provide means for sealing of the threaded rotable valve member and for sealing the body member to the container into which it extends. Both of the seals present areas of possible failure.

Other problems with conventional self venting drain valves are that they extend substantially beyond the lower wall of the unit or container on which they are mounted. This increases the probability that the drain valve may be inadvertently bumped open or completely knocked off the unit. Another problem is that it is sometimes desireable to connect a hose to the drain valve to carry away the fluid discharged from the container. This is not easily done to a drain valve which requires several turns to be opened.

Thus there exists a need for a self venting drain valve that is simpler and less expensive to manufacture. There further exists a need for a self venting drain valve that is lower in profile, opens quickly and which may be readily attached to a hose.

DISCLOSURE OF INVENTION

It is an object of the present invention to provide a self venting drain valve that is inexpensive to manufacture.

It is a further object of the present invention to provide a self venting drain valve that is simpler and more reliable.

It is a further object of the present invention to provide a self venting drain valve that can be opened with a minimum of movement.

It is a further object of the present invention to provide a self venting drain valve which may be attached to a hose.

It is a further object of the present invention to provide a self venting drain valve that is lower in profile.

It is a further object of the present invention to provide a self venting drain valve that cannot be accidentally overtightened.

It is a further object of the present invention to provide a self venting drain valve that cannot be accidentally detached from a fluid container on which it is mounted.

It is a further object of the present invention to provide a self-venting drain valve which can drain fluid through ordinary openings in a wall of the container which open to the interior of the container at the same vertical elevation.

Further objects of the present invention will be made apparent in the following Best Modes for Carrying Out the Invention and the appended claims.

The foregoing objects are accomplished in the preferred form of the invention by a drain valve mounted on a bottom portion of a fuel filter/water separator unit. The unit includes a planar wall. A pivot post projects downward from the planer wall outside of the unit. A fluid hole extends through the planar wall. The fluid hole is elongated along an arc the axis of which extends through the pivot post. A circular vent hole extends through the wall on the opposite side of the pivot post from the fluid hole.

A circular elastomeric sheet is positioned outside the unit on the wall. The pivot post extends through a post access hole in the sheet. The elastomeric sheet also incorporates a liquid access opening similar in configuration to and positioned directly over the fluid hole in the wall so as not to impede liquid flow therethrough. The elastomeric sheet also includes an air access opening similar in configuration to and positioned over the vent hole in the wall. The elastomeric sheet is held to the wall by an adhesive or other holding means.

A cylindrical, movable member is mounted adjacent the elastomeric sheet. The movable member includes a planar upper face and a post hole. The pivot post extends through the post hole journaled therein. The movable member is rotatably movable about the pivot post. The member includes an elongated slot which serves as fluid accepting means. The elongated slot is similar in configuration to the fluid hole in the wall of the unit and is movable into alignment therewith through rotation of the movable member. The elongated slot and the movable member are in fluid connection with a liquid outlet opening in the lower side of the movable member.

The movable member also includes an air inlet opening which is configured similar to the vent hole in the wall of the unit. The air inlet opening is in fluid communication with an air intake opening in the underside of the movable member. The air inlet opening and the elongated slot are positioned so that when the air inlet opening is in alignment with the vent hole, the elongated slot is fully aligned with the fluid hole in the wall of the unit.

A metal retainer ring is mounted on a distal end of the pivot post. The retainer ring holds the movable member to the unit. A wave spring is positioned between the retainer ring and the movable member to apply sealing force and to insure that the elastomeric sheet does not allow fluid to leave the unit or air to enter the unit except through the openings in the movable member.

In a first rotational position of the movable member, the fluid hole in the unit and the elongated slot are disposed from one another. Likewise in the first position, the vent hole of the unit and the air inlet opening in the member are disposed. In this first position, fluid flow out of the unit and air flow into the unit are blocked by the upper planar face of the movable member.

Rotation of the movable member in a first direction approximately one eighth turn from the first position, places the fluid hole and the elongated slot of the movable member in overlapping relation. This places the liquid outlet of the member in fluid communication with the interior of the unit. In this second position, the vent hole of the unit remains blocked by the movable member. The fluid path between the interior of the unit and the elongated slot of the movable member causes some liquid to flow downward into the slot which creates a slight vacuum inside the unit and primes the drain valve.

Upon further rotation of the movable member in the first direction to a third position approximately another one-eighth turn from the second position, the vent hole and the air inlet opening enter into communication. In the third position, the fluid hole and the elongated slot are fully aligned. Air is then enabled to enter the interior of the unit and the liquid will drain from the fluid outlet of the movable member. In the preferred form of the invention, the areas of the liquid outlet opening and the air intake are constructed at a ratio of approximately 2:1 which facilitates draining.

Stop means for the movable member are also used in the preferred form of the invention so the movable member cannot be turned in the first direction beyond the third position. Likewise, stop means are used to prevent turning of the movable member in a second opposed direction beyond the first position. This minimizes the possibility that the movable member will be erroneously mispositioned.

BEST MODES FOR CARRYING OUT INVENTION

Figure 1:
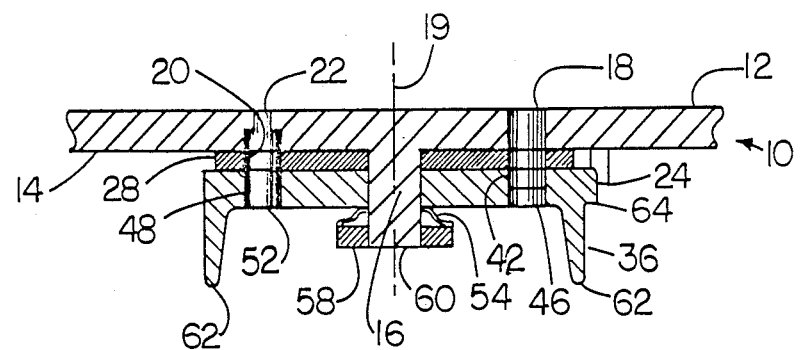
FIG. 1 is a cross sectional view of a first embodiment of the self venting drain valve of the present invention.

Referring now to the drawings and particularly to FIG. 1 there is shown therein a first form of the self venting drain valve of the present invention generally indicated 10. The drain valve is mounted on a lower wall 12 of a fuel filter/water separator unit or other liquid container that is generally air tight. Wall 12 has an outer planar surface 14. A pivot post 16 extends downward from wall 12.

Figure 2:
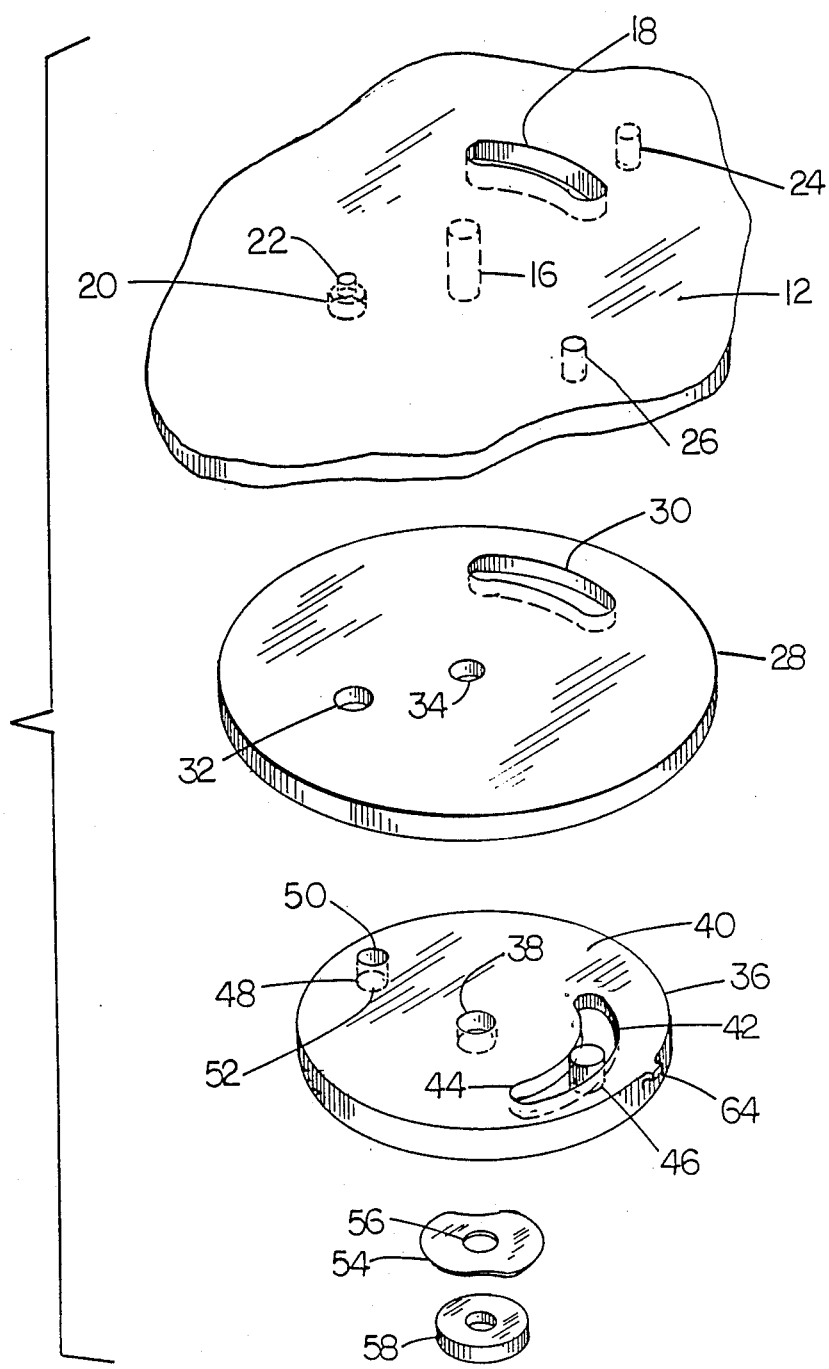
FIG. 2 is an exploded view of the self venting drain valve shown in FIG. 1.

A fluid hole 18 extends through wall 12. As shown in FIG. 2 fluid hole 18 is a kidney shaped hole elongated in an arc, the center of which arc is a pivot axis 19 that extends longitudinally through pivot post 12. The upper portion of fluid hole 18 serves as a first opening to the interior of said container. On the opposite side of the pivot post from fluid hole 18, a vent hole 20 extends through wall 12. Vent hole 20 has a reduced upper portion 22 that is open to the interior of the unit. Upper portion 22 serves as a second opening to the interior of said container. The first and second openings are open to the interior of the fuel filter/water separator unit at generally the same vertical elevation.

Wall 12 also includes a first cylindrical protuberance 24 and a second cylindrical protuberance 26. Protuberances 24 and 26 extend downward from wall 12. The purposes of the protuberances are later explained.

A circular elastomeric sheet 28 is mounted on wall surface 14. A liquid access opening 30 is cut through sheet 28. Liquid access opening 30 is similar in configuration to fluid hole 18 in wall 12. An air access opening 32 also extends through elastomeric sheet 28. Air access opening 32 is similar in configuration to the opening to vent hole 20 in wall surface 14. A post access hole 34 extends through elastomeric sheet 28. Post access hole 34 enables pivot post 16 to pass through the sheet. The elastomeric sheet is held in position on planar wall surface 14 with an adhesive. This insures that liquid access opening 30 is always in alignment with fluid hole 18 and that air access opening 32 is aligned with vent hole 20. Elastomeric sheet 28 is sized so that protuberances 24 and 26 are beyond its outer circumference.

A knob or movable member 36 is mounted adjacent elastomeric sheet 28. Member 36 includes a post hole 38 which accepts pivot post 16 and enables rotational movement of member 36 thereon. Member 36 has a planar upper face 40 which facilitates sealing member 36 against elastomeric sheet 28.

Member 36 incorporates an elongated slot 42 which serves as fluid accepting means. Elongated slot 42 extends part way through member 36 and has a kidney shaped slot opening 44 similar in configuration to fluid hole 18 in wall 12 of the unit. The elongated slot 42 is open to a circular liquid outlet 46 in the underside of the movable member. Liquid outlet 46 serves as fluid passage means and enables the flow of liquid out of the unit when elongated slot 42 and fluid hole 18 are in communication.

Member 36 also incorporates an air passage 48 which extends through the member. Air passage 48 terminates upwardly and an air inlet opening 50 in planar face 40. Air passage 48 terminates in the underside of the movable member in an air intake opening 52. Air passage 48 is cylindrical and similar in configuration to vent 20 in wall 12. The ratio of the area of a liquid outlet 46 to the area of air intake 52 is approximately 2:1. Applicant has found that using this configuration facilitates operation of the drain valve.

A wave spring 54 is positioned underneath movable member 36. Wave spring 54 includes a central opening 56 through which pivot post 16 extends. Wave spring 54 serves as biasing means for biasing movable member 36 against elastomeric sheet 28.

A retainer ring 58 is mounted on a distal end 60 of pivot post 16. Ring 58 is a metal ring which serves as a retaining means for holding wave spring 54 biased against member 36 as well as for holding the movable member to the unit. In the preferred form of the invention, pivot post 16 is made of plastic material and ring 58 is heat welded to the distal end 60 of the pivot post.

Movable member 36 incorporates a cylindrical downwardly extending flange 62. As shown in FIG. 1 flange 62 blocks access to pivot post 16 and retainer ring 58. Flange 62 serves to reduce the possibility that the retaining ring or pivot post will be accidentally bumped or knocked off the unit.

Movable member 36 also includes a projection 64 which extends radially from an outer surface thereof. Projection 64 in conjunction with protuberances 24 and 26 serve as stop means. When the movable member is in a fully open position, projection 64 engages first protuberance 24 and prevents rotation of the member beyond the fully open condition. When the movable member 36 is in a fully closed position, projection 64 engages second protuberance 26 to prevent rotation of the movable member beyond the fully closed position.

Figure 3:
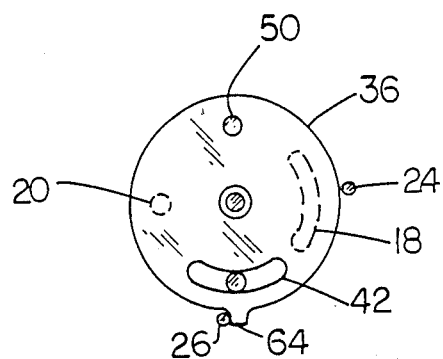
FIG. 3 is a bottom view of the self venting drain valve shown in a closed first position.

The operation of the self venting drain valve is now explained with reference to FIGS. 3 through 5 which are partial bottom views of the self venting drain valve. When movable member 36 is in the first position shown in FIG. 3, the drain valve is fully closed. In this position, elongated slot 42 is disposed of fluid hole 18 and the liquid access opening in elastomeric sheet 28. In this first position, fluid flow is blocked by planar face 40 of the movable member.

In the first position, air inlet opening 50 of air passage 48 is disposed of the vent hole 20 in the unit and the air access opening in the elastomeric sheet. Therefore air flow into the unit is also blocked by planar face 40 of the movable member. In the first position, projection 64 is engaged with second protuberance 26 to prevent rotation of the movable member in a clockwise direction as shown in FIG. 3. This prevents the movable member from being closed beyond what is necessary to fully close the drain valve.

Figure 4:
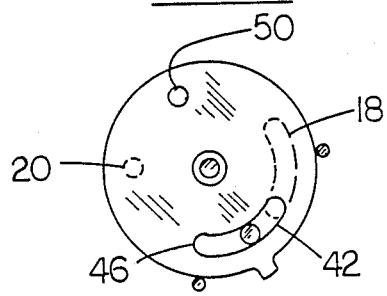
FIG. 4 is a bottom view of the self venting drain valve in a second, primed position.

FIG. 4 shows movable member 36 in a second position, turned in a first direction counterclockwise approximate one-eighth turn from the first position. In the second position elongated slot 42 of the movable member overlaps in fluid hole 18 and the liquid access opening in the elastomeric sheet. This places the liquid outlet 46 in fluid communication with the interior of the unit. A slight flow of liquid occurs as a result of the interior of the unit being open to the outside. This primes the drain valve and results in a slight vacuum within the unit. In the second position vent hole 20 of the unit remains blocked by the planar face of the movable member. This prevents air from entering the the unit.

Figure 5:
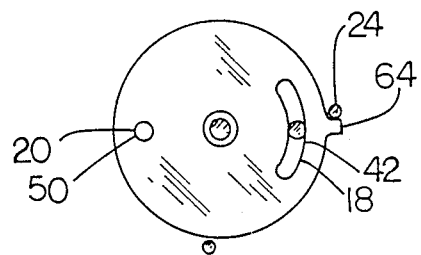
FIG. 5 is a bottom view of the self venting drain valve in a third, open position.

Further rotation of the movable member in the first direction approximately another one-eight term places the movable member in a third position shown in FIG. 5. In the third position, the elongated slot 42 is fully aligned with fluid hole 18 in the unit. Likewise, vent hole 20 in the unit is in alignment with air inlet opening 50 in the movable member. Air is enabled to enter the unit and the liquid therein readily drains through the liquid outlet. As air is enabled to enter the unit only after the liquid outlet is primed, liquid will not escape from the unit through the air intake. Conversely, air will not attempt to enter the unit through the drain. Either of these conditions would slow the draining process.

In the third position of the movable member shown in FIG. 5, projection 64 engages first protuberance 24. This prevents the movable member from being accidentally turned in the first direction beyond to the fully open position which would impede the draining process.

The new self venting drain construction of the preferred form of the present invention shown in FIGS. 1 though 5 is designed to drain the unit into an open vessel such as a bucket. It is sometimes desireable however, to conduct the liquid drained from the unit through a hose to another apparatus or tank. An alterative embodiment of the invention shown in FIG. 6 includes a cylindrical projection 70 which is integral with the liquid outlet of the movable member. A rubber hose (not shown) may be attached to the cylindrical projection. As movable member 36 is turned only one-fourth turn from the fully open to the fully closed position a flexible hose may be attached with a minimum of difficulty to the movable member of the self venting drain valve.

Figure 6:
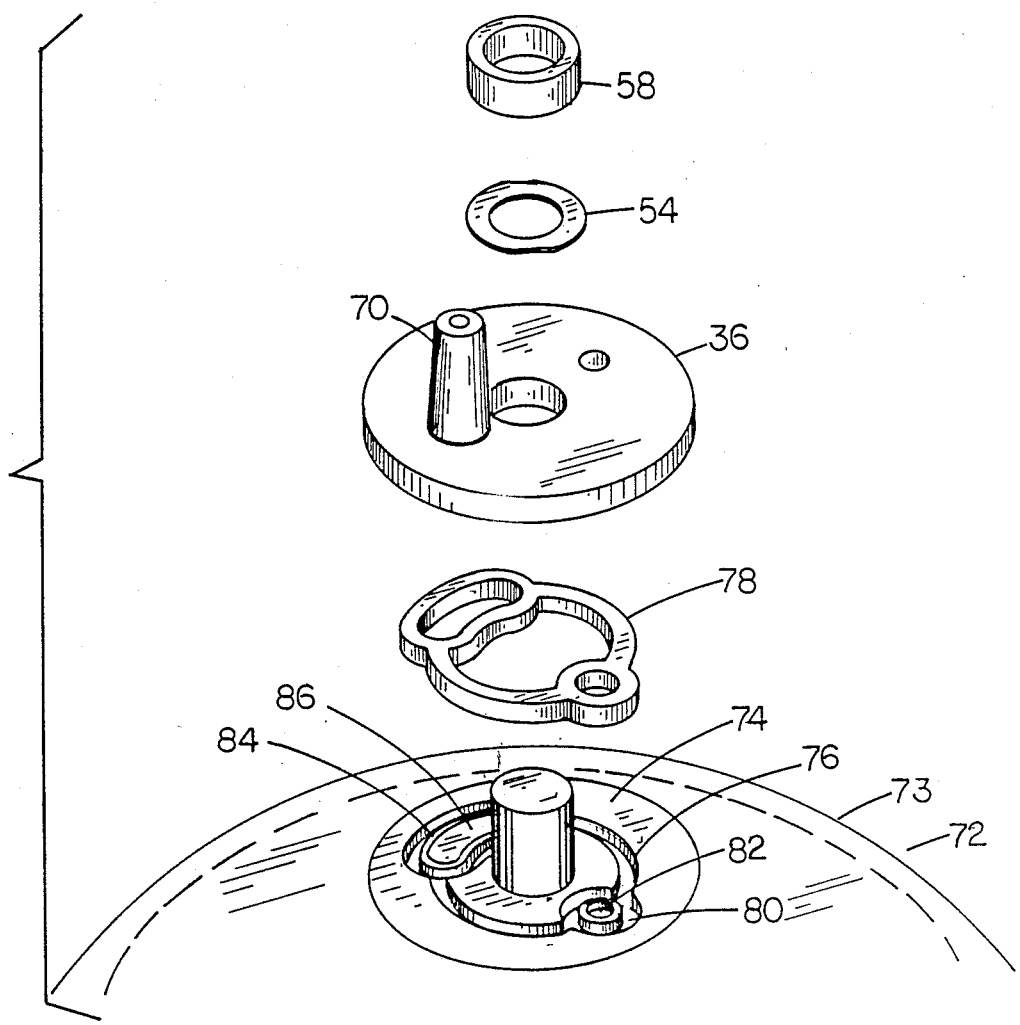
FIG. 6 is an exploded view of a second embodiment of the self venting drain valve of the present invention adapted for attachment to a fluid drain hose.

The alternative embodiment shown in FIG. 6 is shown mounted on a collection bowl 72 of a fuel filter/water separator or other device. Bowl 72 generally has a curved outer surface 73, however it has a flat outer portion 74 at its lower most portion (the bowl is shown inverted in FIG. 6). Flat portion 74 includes a recess 76. Recess 76 is shaped similarly to an elastomeric gasket 78. Gasket 78 is of somewhat greater thickness than the depth of recess 76. Recess 76 is configured such that there is a first ridge 80 surrounding a vent hole 82 and a second ridge 84 surrounding an elongated fluid hole 86 in the bowl. Gasket 78 performs the function of the elastomeric sheet in the first embodiment. The recess 76 serves to hold the gasket in position and the ridges 80, 84 prevent the gasket from being moved over the vent or fluid holes by the force exerted by the moveable member on the gasket. The other elements of the second embodiment are similar to those in the first embodiment.

Thus, the new self venting drain valve achieves the above stated objectives, eliminates difficulties encountered in the use of prior devices, solves problems and obtains the desireable results described herein.

In the foregoing description, certain items have been used for brevity, clarity and understanding, however, no unnecessary limitations are to be implied therefrom because such terms are for descriptive purposes and are intended to be broadly construed. Moreover, the descriptions and illustrations given are by way of example and the invention is not limited to the exact details shown or described.

Having described the features, discoveries and principles of the invention, the manner in which it is constructed and operated and the advantages and useful results obtained, the new and useful structures, devices, elements, arrangements, parts, combinations, systems, equipment, operations and relationships are set forth in the appended claims.

I claim:

1. A self venting drain valve for draining liquid contained in a generally air tight container, said container including a wall on a lower portion thereof, comprising:
   a fluid hole in said wall for passing liquid therethrough, said fluid hole communicating with the interior of said container through a first opening;
   a vent hole in said wall for passing air therethrough, said vent hole disposed of said fluid hole and communicating with the interior of said container through a second opening, said first and second openings located generally at the same vertical elevation in said container;
   a movable member mounted for movement in a first direction on said container, said member including;
   a planar face adjacent said wall, said planar face in blocking relation of said fluid hole and vent hole when said member is in a first position;
   said member further including fluid accepting means in said face for accepting liquid delivered at said fluid hole, said fluid accepting means in fluid communication with said fluid hole when said member is in a second position and a third position;
   a liquid outlet in fluid communication with said fluid accepting means; and
   an air passage through said member, said air passage terminating at an air inlet opening in said face, said air inlet opening in communication with said vent hole when said member is in the third position;
   whereby when said member is in the first position said drain valve is closed, upon movement of said member in the first direction to the second position, said container is placed in a negative pressure condition and upon further movement of said member in said first direction to a third position, air is enabled to enter said container through said air passage enabling liquid to drain through said liquid outlet.

2. The drain valve according to claim 1 and further comprising sealing means for sealing said wall and said movable member in fluid tight relation.

3. The drain valve according to claim 1 wherein said fluid hole is elongated in the first direction whereby said fluid hole is in overlapping relation with the fluid accepting means of said movable member in said second and third positions.

4. The drain valve according to claim 3 wherein said fluid accepting means is an elongated slot in said member, said elongated slot is elongated in said first direction.

5. The drain valve according to claim 4 wherein said slot includes a slot opening, said slot opening and said fluid hole being similar in configuration and aligned when said member is in the third position.

6. The drain valve according to claim 5 wherein said vent hole and said air inlet opening are similar in configuration and fully aligned when said member is in the third position.

7. The drain valve according to claim 6 and further comprising sealing means for sealing said fluid hole and said slot opening and said vent hole and said air inlet opening in fluid tight relation.

8. The drain valve according to claim 7 wherein said sealing means includes an elastomeric sheet, said sheet including a liquid access opening and an air access opening therethrough, said liquid access opening in fluid communication with said fluid hole and configured similarly thereto, and said air access opening being in fluid communication with said vent hole and configured similarly thereto.

9. The drain valve according to claim 7 and further comprising a recess in an outer portion of said planar wall and wherein said sealing means includes an elastomeric gasket positioned in said recess.

10. The drain valve according to claim 8 wherein said sealing means further comprises biasing means for biasing the said movable member against said elastomeric sheet.

11. The drain valve according to claim 10 wherein said movable member is rotatable about a pivot axis and said first direction is a first rotational direction.

12. The drain valve according to claim 11 wherein said movable member is generally cylindrical and the air inlet opening and the slot opening are generally opposed of said pivot axis.

13. The drain valve according to claim 12 and further comprising a pivot post extending from said wall along said pivot axis, said movable member journaled on said pivot post.

14. The drain valve according to claim 13 wherein said pivot post extends through said movable member, and further comprising retaining means at a distal end of said pivot post for holding said member to said container.

15. The drain valve according to claim 14 wherein said biasing means is a spring positioned coaxial with said pivot post and between said retaining means and said movable member.

16. The drain valve according to claim 15 wherein said spring is a wave spring.

17. The drain valve according to claim 16 and further comprising an air intake at the outer surface of the air passage through the member, and wherein the ratio of the area of the liquid outlet and the air intake is generally 2:1.

18. The drain valve according to claim 17 and further comprising first stop means for preventing rotation of said member in the first direction when said member is in the third position.

19. The drain valve according to claim 18 wherein said first stop means comprises a projection extending from said member and a first protuberance extending from said wall, said projection and said first protuberance being in engagement in the third position to prevent further rotation in said first direction.

20. The drain valve according to claim 19 and further comprising second stop means for preventing rotation of said member in a second direction opposed of said first direction when said member is in the first position.

21. The drain valve according to claim 20 wherein said second stop means comprises a second protuberance extending from said wall, said projection and said second protuberance engaging in said first position to prevent further rotation of said member in said second direction.

22. A self venting drain valve for draining liquid contained in a generally air tight container, comprising:
a generally planar wall on a lower portion of said container;
a fluid hole extending through said planar wall and communicating with the interior of said container through a first opening, said fluid hole elongated in a first arcuate direction about a pivot axis, said pivot axis generally perpendicular of said planar wall;
a vent hole extending through said planar wall, said vent hole disposed of said fluid hole and communicating with the interior of said container through a second opening, said first and second openings located generally at the same vertical elevation in said container;
a movable member mounted to said vessel, said member being mounted for rotational movement about said pivot axis, said movable member including a planar face in opposed relation of said planar wall, said movable member including a slot in said planar face, said slot arcuately elongated in said first direction and in fluid communication through said member with a fluid outlet, said slot configured similarly to said fluid hole; said member being movable from a first position wherein said planar face is in blocking relation of said fluid hole, through a second position wherein said fluid hole and said slot are in overlapping relation, to a third position wherein said fluid hole and said slot are in alignment, said movable member further including in its planar face an air inlet opening, said air inlet opening in fluid communication through said member with an air intake, said air inlet opening configured similarly to said vent hole, said planar face of said member being in blocking relation of said vent hole in said first and second positions, and said vent hole and said air inlet openings being in alignment with said member is in the third position.

* * * * *